Patented Oct. 25, 1932

1,884,919

UNITED STATES PATENT OFFICE

LYNDON G. THOMPSON, OF OAKLAND, CALIFORNIA, ASSIGNOR, BY MESNE ASSIGNMENTS, TO AMERICAN BITUMULS COMPANY, OF SAN FRANCISCO, CALIFORNIA, A CORPORATION OF DELAWARE

ASPHALTIC EMULSIONS AND METHOD OF MAKING THE SAME

No Drawing. Application filed July 11, 1928, Serial No. 292,036, and in Canada July 25, 1927.

This invention relates to the production of aqueous emulsions of bitumen or asphalt, suitable for use in road-making by the cold laying process, and adapted also to a variety of other commercial uses.

One object of this invention is the production of an aqueous asphaltic or bituminous emulsion, which, while possessing quick drying and other properties required for the uses referred to above, shall be characterized by a high degree of stability. This is a matter of much practical importance; for it has been found to be the case with various bituminous emulsions as heretofore produced that, while possessing certain valuable properties, they were liable to discharge unexpectedly while in transit or in storage (the cause being sometimes difficult to determine) with the result that the purchaser of a shipment of emulsion might find himself in possession of perhaps a number of barrels or a tank-car filled with a solid material in an unmanageable condition instead of the liquid substance required for his work. In cases of that sort heavy losses result, for the reason that solidified asphalt or bitumen can be properly removed from a tank-car only by heating, and from barrels by the destruction of the latter. And even when removed from its container the asphalt in a solid state would be unfit for the purpose for which it was purchased.

The emulsion made according to the present invention is found to possess such a high degree of stability that it will remain indefinitely in the emulsified condition, retaining its great fluidity, provided only it be kept from exposure to the air. For upon exposure to the air its quick-drying property speedily asserts itself.

A further object of the present invention is to produce a stable aqueous emulsion such as above described, and which retains the desired property of quick drying upon exposure to the air, having in admixture therewith a minimum quantity of impurities, that is to say, of the emulsifying and stabilizing ingredients.

A further object of the invention is the production of an emulsion having, in addition to a high degree of stability, as stated above, sufficient power of penetration to permit of its being used in road making by the so-called "penetration method"; which method consists essentially in simply pouring or pumping the liquid binding agent upon the surface of the crushed rock, or other material aggregate, after the latter has been spread upon the roadway.

Another object of the invention is the avoidance of batch losses during the operation of forming the emulsion. Such losses are of frequent occurrence; and when they occur (which is whenever the correct procedure for obtaining a successful emulsification is not followed in all essential particulars) there are attendant difficulties and losses, such as the necessity for cleaning out the apparatus (sometimes a very difficult matter) with the incidental loss of the use of the plant and the time of the employees during the cleaning operation.

In carrying out the present invention the following procedure may be followed with advantage:—

The emulsion is formed in a mixing vessel capable of holding about a ton of material, and in it is placed to begin with about 700 pounds of water, which is kept at about 200° F. or over. To this water is added about 3.5 pounds of sodium hydrate, that is, about ¼ of one percent in weight of the total mass. About 700 pounds of asphalt, the same amount by weight as that of the water, constitutes the batch; and the asphalt is kept in readiness for use at a temperature of approximately 215° F.

About seven pounds of a colloidal clay, preferably Bentonite (equal to about one percent of the weight of the alkaline solution), the clay having been thoroughly mixed into a slurry, is then introduced into the vessel and is thoroughly stirred in with the water. Thereupon a small part of the asphalt in melted condition is allowed to run slowly into the alkaline and clay mixture, the whole being thoroughly agitated; and when a slight scum of asphalt appears on the surface of the mixture oleic acid is added, to an amount equal to about 0.14 of one percent, reckoned on the weight of the total emulsion; that is to say, about two pounds. The remainder of the asphaltic content is then added to the mixture and the agitation is continued until emulsification is complete. Ordinarily this will be a matter of less than a minute.

In carrying out the process it is not necessary or desirable, to interrupt the flow of the asphalt; the essential thing being that part of the asphalt be introduced into the alkaline solution before the oleic acid is added.

Or the following procedure may be followed with excellent results:

First, a slurry of water and Bentonite clay is formed, containing about 12 percent of the latter by weight, and this slurry is introduced into a mixing vessel equipped with rotary stirrers geared to move in opposite directions, the liquid being heated to about 170° F. More water is then added, in quantity sufficient to fill the vessel to about half its capacity, the temperature being raised to about 180° F. Flake caustic soda (in quantity less than one-half of one percent of the final product) is then incorporated, thus making the mixture slightly alkaline. At this point the introduction of the asphalt (preferably in melted condition) begins. It is run in slowly, with constant agitation, until a slight scum appears on the surface of the water, at which point oleic acid is incorporated to an amount somewhat less than two percent of the entire product, by weight. The rest of the asphalt content is then added.

Assuming the weight of the entire batch to be 1400 pounds, then the total of the water would be about 644 pounds, of asphalt about 700 pounds, of Bentonite about 14 pounds, of caustic soda about 5 pounds, and of oleic acid about 20 pounds.

The analysis of the emulsion would be about as follows:

| | Per cent |
|---|---|
| Asphalt | 48 to 50 |
| Water | 46 to 48 |
| Oleic acid | 1.43 |
| Caustic soda | .36 |
| Bentonite | 1.00 |

In order to make the production of the emulsion a continuous operation, and to insure the avoidance of batch losses, it is preferred that only about 75% of any given batch be drawn off at one time, and that the remainder of the old batch be stirred up with the new charges of materials whenever they are added to the mixing apparatus.

The stability of this emulsion appears to be in direct ratio to the quantity of clay used; and beginning with a clay percentage such as has been mentioned herein the clay content may be increased if an emulsion of an exceptionally high degree of stability be desired. But for the purpose herein mentioned, the emulsifying agents when used as called for by this method need not exceed more than about 3% of the total mass.

Notwithstanding that the emulsifying agents are in very small percentages, this emulsion will remain in the stable emulsified stage as long as it may be needed, if kept in closed containers or cars. Furthermore, it will be observed that the total impurities do not exceed 3% of the mass, not figuring the water, which, of course, dries out in a day or two.

While road-making has been specially mentioned, it is obvious that there is an almost unlimited field for this product, since it is practically pure asphalt when dried out and can be used in any place where the hot bitumen or asphalt is now commonly used.

It seems to make little or no practical difference in the result at what stage of the process the clay is added. It may be introduced into the dilute alkaline solution prior to the addition of any asphalt or thereafter; or it may be introduced prior to the addition of any oleic acid or thereafter. But the first step, i. e. the mixing of some of the asphalt to the extent indicated with the alkaline water used appears to be an essential to uniform commercial results without occasional batch losses. Neither the clay used in this process, nor the saponifying agent in the quantity used, would alone produce a stable emulsion.

This type of emulsion, without colloidal clay, is not suitable for asphaltic concrete. The addition of clay imparts adhesiveness to the emulsion, so that it will better adhere to rock and sand when mechanically churned or mixed together.

This type of emulsion without colloidal clay breaks down and sets very rapidly and is therefore not suited for delayed operations. The addition of colloidal clay will permit rock and sand when mixed with this emulsion to be transported long distances, or to be kept in stock piles until desired for use.

The emulsion produced as hereinbefore described, possesses not only the great fluidity and the quick drying and other desirable properties of the emulsion described in my copending application of even date herewith, Serial No. 292,037, but has also a high degree of stability, there being no separation of the ingredients or settling in the containers. It is well adapted in every respect for use in road making by the penetration method. It can be diluted in water in all proportions, and can be readily bladed on the road in making what is known as "the mixing type" of pavement; in the laying of which the mineral aggregate is first spread upon the roadway, and the asphalt is then poured or otherwise distributed over it and is thoroughly commingled therewith, usually by means of a disk harrow and a spring-tooth harrow, and after the final application of the asphalt (there being usually three applications thereof) the road material is bladed from one side of the road to the other until a thorough distribution of the asphalt throughout the entire mass has been effected. In cases where the material (gravel for example) is already on the roadway and properly graded, the emulsion may be applied thereto after harrowing, and the road may be finished by blading as above described. In this case the cost of fresh road material is entirely saved.

This type of road making has not been successful heretofore when hot asphalt of the same high grade as that used in making this emulsion has been employed. But with an emulsion highly stabilized as herein described, the mixing type of road making can be carried out with successful results, both as to economy of construction and also as to the good quality and durability of the resulting roadway.

The use of Bentonite as the stabilizing element is preferred because I have found that that particular variety of colloidal clay imparts to the emulsion a very high degree of stability in proportion to the quantity used. The stabilizing effect is due to the fact that, in the formation of the emulsion, the soap film which surrounds each particle of asphalt is itself enveloped by a thin film of clay, which has the effect of further separating and preventing the coalescence of the dispersed particles of asphalt.

Furthermore, the emulsion made as herein described, can be mixed together with the mineral aggregate in an ordinary concrete mixer. This cannot be done, so far as I am aware, with an emulsion of the soap type that has not been stabilized as herein described by the addition of colloidal clay.

What is claimed is:—

1. A method of producing asphaltic emulsions, consisting in forming a hot weak solution of alkali, melting a mass of asphalt in weight approximately equal to the aqueous solution, stirring a part of the melted asphalt into the said solution, adding the former slowly to the latter until a scum begins to form on the surface, then adding a small quantity (approximately half of one percent of the final product) of oleic acid, then adding the rest of the asphaltic content while maintaining the high temperature and the agitation, a substantial quantity, less than 2 per cent of clay being added to impart the desired degree of stability and adhesiveness.

2. A method of producing asphaltic emulsions, consisting in adding melted asphalt to a hot dilute alkaline solution with strong agitation, the asphalt being added in two portions, introducing a saponifiable agent after the addition of the first portion of the asphaltic content, and adding a substantial quantity of clay, less than 2 per cent, as a stabilizing material.

3. A method of producing asphaltic emulsions, consisting in forming a hot weak alkaline solution, adding thereto gradually and with strong agitation a mass of melted asphalt, introducing a small amount of a saponifying agent after part of the asphalt has been stirred in, and adding a substantial amount, less than 2%, of colloidal clay to impart the requisite stability to the emulsion.

4. An aqueous asphaltic emulsion consisting of approximately equal parts of water and asphalt, not more than about two percent of a saponified emulsifier and a substantial quantity, less than 2 percent, of Bentonite, said emulsion being characterized by a brown color, quick drying, high stability, great fluidity, high penetrating power, and adhesiveness.

5. An aqueous asphaltic emulsion consisting of approximately equal parts of water and asphalt, a saponified emulsifier, and a substantial quantity, less than 2 percent, of colloidal clay, the amount of materials other than asphalt and water constituting not more than three percent by weight of the entire mass, said emulsion being characterized by a brown color, quick drying, high stability, great fluidity, high penetrating power, and adhesiveness.

6. In a method of producing stable emulsions containing about equal parts of asphalt and water, the steps of introducing a part of the total asphaltic content in fluid condition into hot aqueous alkaline solution with agitation, then adding not more than about one percent of a substance capable of saponifying with the alkali to the mixture, and then introducing the remainder of total asphaltic content into the mixure with accompanying agiation to form an emulsion, a substantial amount, not more than about two percent of a colloidal clay being added to said mixture prior to the introduction of the final portion of asphalt.

7. In a method of producing stable emulsions containing about equal parts of asphalt and water, the steps of introducing a part of the total asphaltic content in fluid condition into a hot aqueous alkaline solution with agitation, then adding not more than about one percent of a fatty acid to the mixture, adding a substantial amount not more than about two percent of a colloidal clay to the mixture, and then introducing the remainder of the total asphaltic content into the mixure with accompanying agitation to form an emulsion.

8. In a method of producing stable emulsions containing about equal parts of asphalt and water, the steps of introducing a part of the asphalt in fluid condition into a hot aqueous caustic soap solution with agitation until a scum of asphalt appears on the surface of the mixture, then adding a substance capable of saponifying with the alkali to the mixture, and then introducing the remainder of the total asphaltic content into the mixture with accompanying agitation and while maintaining the mixture at an elevated temperature to form an emulsion, a substantial amount not more than about two percent of a colloidal clay being added to said mixture prior to the introduction of the final portion of asphalt.

9. In a method of producing stable emulsions containing about equal parts of asphalt and water, the steps of introducing a part of the asphalt in fluid condition into a hot aqueous caustic soap solution with agitation until a scum of asphalt appears on the surface of the mixture, then adding not more than about one percent of fatty acid to the mixture, and then introducing the remainder of the total asphaltic content to the mixture with accompanying agitation to form an emulsion, a substantial amount not more than about two percent of a colloidal clay being added to said mixture prior to the introduction of the final portion of asphalt.

10. In a method of producing stable emulsions containing about equal parts of asphalt and water, the steps of forming a hot aqueous alkaline solution, adding a substantial amount not more than about two percent of a colloidal clay thereto, then introducing a part of the asphalt in fluid condition into said alkaline mixture until a scum appears on the surface of the mixture, then adding a substance capable of saponifying with the alkali to the mixture, and finally introducing the remainder of the total asphaltic content into the mixture with accompanying agitation to form a stable emulsion.

11. A method of producing asphaltic emulsions comprising forming a hot weak aqueous alkali solution, reducing a mass of asphalt of about the same weight as the alkali solution to a fluid condition, introducing a part of the asphalt into the alkali solution with agitation, adding not more than about 1% of a saponifiable substance to the mixture, and finally introducing the remainder of the asphalt with agitation into the mixture to form an emulsion, a substantial amount not more than about 2% of a colloidal clay being added to said mixture prior to the introduction of the final portion of asphalt to impart the desired stability and adhesiveness to the emulsion.

In testimony whereof I have signed this specification.

LYNDON G. THOMPSON.